(12) United States Patent
Reinhard et al.

(10) Patent No.: US 6,325,754 B1
(45) Date of Patent: Dec. 4, 2001

(54) ACCELERATION PROTECTION SUIT

(75) Inventors: Andreas Reinhard, Zollikon; Wendelin Egli, Seuzach, both of (CH)

(73) Assignee: LSS Life Support Systems AG, Zollikon (CH)

( * ) Notice: Subject to any disclaimer, the term of this patent is extended or adjusted under 35 U.S.C. 154(b) by 0 days.

(21) Appl. No.: 09/446,441

(22) PCT Filed: Apr. 20, 1999

(86) PCT No.: PCT/CH99/00159

§ 371 Date: Apr. 20, 1998

§ 102(e) Date: Apr. 20, 1998

(87) PCT Pub. No.: WO99/54203

PCT Pub. Date: Oct. 28, 1999

(30) Foreign Application Priority Data

Apr. 20, 1998 (CH) ..................................... 900/98

(51) Int. Cl.⁷ .............................. B64D 10/00; B64G 6/00
(52) U.S. Cl. ................................................................ 600/20
(58) Field of Search ......................................... 600/19–20

(56) References Cited

U.S. PATENT DOCUMENTS

| | | | |
|---|---|---|---|
| 2,228,115 | 1/1941 | Holste | 128/1 |
| 3,523,301 | 8/1970 | Davis et al. | 200/21 |

FOREIGN PATENT DOCUMENTS

| | | |
|---|---|---|
| EP 0348835 | 1/1990 | (EP) . |
| FR 2581964 | 11/1986 | (FR) . |
| GB 959350 | 7/1962 | (GB) . |
| WO 91/03278 | 3/1991 | (WO) . |
| WO 99/54200 | 10/1999 | (WO) . |
| WO 99/54201 | 10/1999 | (WO) . |
| WO 99/54202 | 10/1999 | (WO) . |

*Primary Examiner*—John P. Lacyk
(74) *Attorney, Agent, or Firm*—Jenkens & Gilchrist (57) ABSTRACT

The active part of the suit comprises in part one layer (3, 4) facing the body and another one facing away from it, both of a gas-tight, low stretch textile material, which are joined together at connecting positions (6) by gluing, welding or sewing and thereby create hollow spaces (5), which are connected together via valves (18) and can be put under pressure. Between the regions, which comprise the layers (3, 4)—bands (11, 12)—connecting parts (7) are arranged, which transmit tensile forces only. If the hollow spaces (5) are put under a gas pressure proportional to the z-acceleration, then the suit builds up a compensating applied pressure and thus frees the organism of the pilot from the loading effects of such accelerations. By a suitable choice of the width of the bands (11, 12) in conjunction with the radius of the enclosed part of the body a compensating pressure to the hydrostatic pressure, proportional to the acceleration, of the body fluids can be set up.

37 Claims, 6 Drawing Sheets

ACCELERATION PROTECTION SUIT

The present invention relates to a suit for protection against the effects of acceleration, as arise in high performance aircraft when flying in curves, in accordance with the preamble to Claim 1.

Several such protective suits have become known. They can essentially be divided into two categories:
the first class comprises protective suits, which work on the hydrostatic force principle,
the second category comprises protective suits, which are inflated with compressed air.

The construction of suits in the first class rests on the inventive concept of compensating the acceleration induced fluid pressure of the inner body, increasing downwards, by an essentially similar fluid column built up in the protective suit, which works on the body from the outside.

Examples of this category of protective suits are known from EP 0 376 027 (D1) and U.S. Pat. No. 5,153,938 (D2). Further in this class, three applications, which relate to such protective suits, are known from the same applicant as the present patent application: PCT/CH98/00160 (D3), PCT/CH98/00161 (D4), PCT/CH98/00534 (D5).

In the protective suits of the second category an air pressure is built up in the at least partly double walled construction of the protective suit. This is either the same size over the whole suit or so directed via controlled valves that it is larger for the lower parts of the body than for the upper parts. The control of these valves and of the prescribed air pressure is effected by an on-board computer.

Examples of documents, which give these two categories of the state of the art are EP 0 646 523 (D6), JP 0 9011 996 (D7).

Although it has been shown that the idea of hydrostatic compensation in itself represents an excellent solution for the problem, difficulties arise in its conversion into practice. These lie on the one hand partly in the high additional weight of such protective suits, further difficulties arise in the characteristics of the textiles used and finally the comfort of the wearer of such known protective suits is insufficient and the mobility of the pilot is thereby greatly restricted. Furthermore high requirements are placed on the sealing of such suits, on the one hand because a fluid loss leads to functional impairment, and on the other hand because an outflow of fluid into the cockpit of a high performance aircraft is entirely undesirable.

The solutions of the second category of inventions rest upon the build up of pressure in the, at least in part, double walled construction of the protective suit, which corresponds somewhat to the anticipated hydrostatic pressure of the body fluid—especially the blood. Somewhat for the reason that the hydrostatic pressure increases linearly from above to below, and the pneumatic compensation in general is limited to one or a few pressure values.

In order to generate these pressure values, the on-board compressed air supply is fed to the appropriate parts of the protective suit via one or more acceleration dependent controlled valves, as for instance is known from U.S. Pat. No. 4,895,320.

The build up of the required pressure always demands a certain time. To compensate for this delay, computerised means are proposed, as known from D6. The disadvantage of the known protective suits which rely on purely pneumatic pressure lies on the one hand in the narrow differentiation of the compensating pressure, in an often clumsy construction and the large outlay for the controller. High cost is always associated with this.

The aim which is to be addressed by the present invention, comprises the provision of a suit for protection against the effects of acceleration, which arise in curved flight in high performance aircraft, firstly in the instantaneous and local Z-axis, further the protective suit to be provided is to be lighter than those previously known, should be possible for the wearer to put on and take off without help and facilitate his climbing into and leaving the aircraft without assistance, and allow the wearer to have normal mobility outside the aircraft, all this combined with a reduced outlay in apparatus and finance.

The addressing of the stated aim is given in Claim 1 as regards its essential characteristics, in the further claims regarding further advantageous embodiments.

The concept of the invention is more closely described using the attached drawings. Shown are
FIG. 1a a cross section through the layered construction of the protective suit,
FIG. 1b a modification thereof,
FIG. 2a a plan view b a first section c a second section through a first arrangement of connecting positions,
FIG. 3 a cross section through a second arrangement of connecting positions,
FIG. 4 a front view of an example of construction of the protective suit in two modifications,
FIG. 5 a schematic cross section through a part of the suit,
FIG. 6a,b a schematic representation of the interworking of pressure and tension,
FIG. 7 a schematic representation of the build up of contact pressure,
FIG. 8 a first example of construction of a flying boot,
FIG. 9 a second example of construction of a flying boot,
FIG. 10 a schematic side view of a sitting pilot with an additional device,
FIG. 11 a detailed view from FIG. 10
FIG. 12 the schematic representation of the pressure breathing system.

The protective suit according to the invention comprises essentially three pieces of clothing. The innermost comprises, as shown schematically in FIG. 1a, a textile lining 1. The actual protective suit is worn over this. This is constructed from an inner layer 3 and an outer layer 4. The layer 3 comprises a reinforced gas-tight plastics material, whereby the reinforcement comprises a low stretch fibre material such as for instance aramid fibre. The layer 4, made of the same material as layer 3, is joined in places to the layer 3. The connection of the layers 3 and 4 is effected for instance by welding, or sewing with a subsequent sealing of the stitching. The pattern arising from the joining of the layers 3, 4 will—as being essential to the invention—be separately considered below. Between the layers 3, 4 air, or another suitable gas, is present in the hollow spaces 5 created by their joining. On the outer side of the layer 4, joined to it over the whole surface or in places, there is a husky textile oversuit 2 onto which all the objects and devices necessary for a pilot's suit are affixed.

The presence of the lining 1—or underclothes corresponding to it—and the oversuit 2 is of itself known. In accordance with the invention the ensemble of the layers 3, 4, of the lining 1 and the oversuit 2 can be produced separately, or be produced with them joined together. The active part of the protective suit according to the invention comprises the layers 3, 4 partly joined together.

Figure 1A:
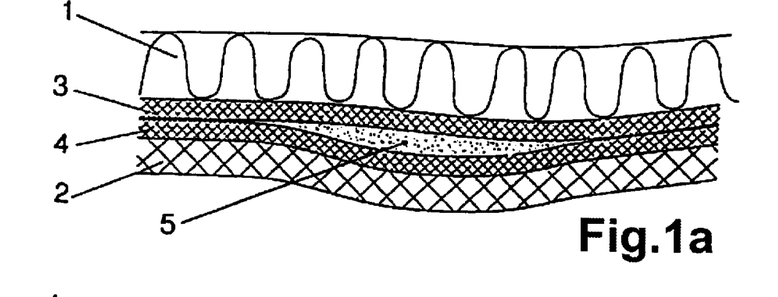
Figure 1B:
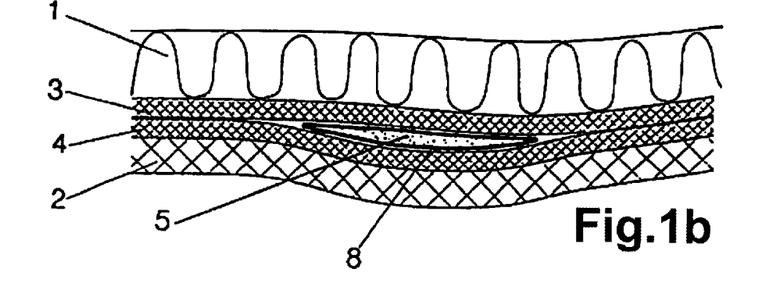

In FIG. 1b a modification of a part of FIG. 1a is shown. In the hollow space 5 a tube 8 is inserted, for instance made of an elastomer. Thereby a separation is achieved between sealing and strength. The layers 3, 4 and their joining assume the task of strength, the tube 8 that of sealing. When the hollow space 5 is referred to below, both modifications are always to be understood, that of FIG. 1a, where the hollow space 5 itself is produced airtight and that of FIG. 1b, where the tube 8, as an airtight and gas carrying element, is inserted into the hollow space 5, which itself is no longer airtight or does not have to be.

Figure 2A:
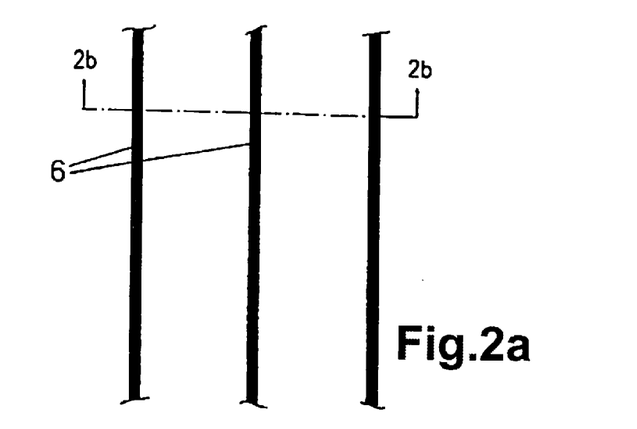
Figure 2B:
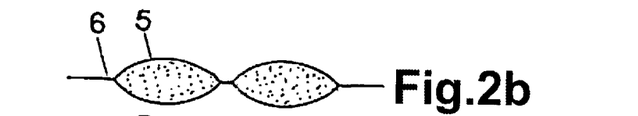
Figure 2C:
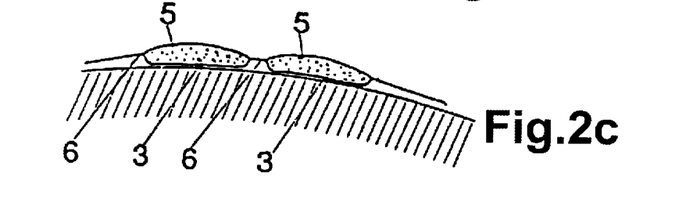
Figure 3:
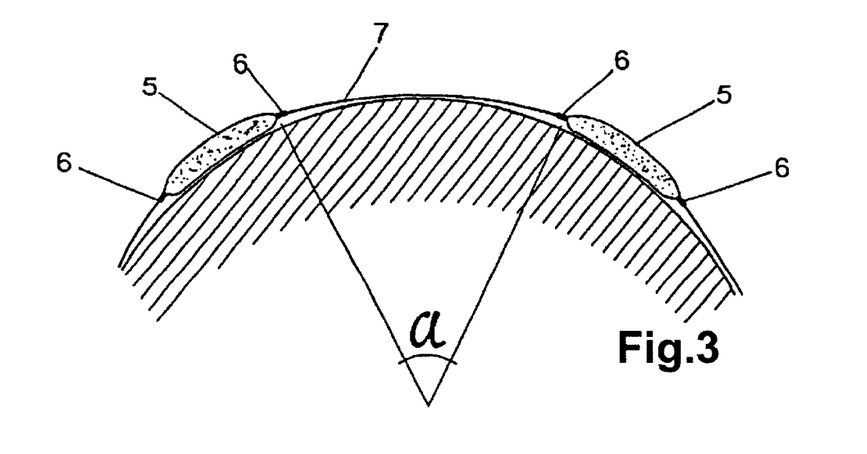

FIGS. 2a, b, c, show in detailed views the application of connection positions 6 to the layers 3, 4. As already explained, these connection positions can be produced by welding, gluing or sewing. In FIG. 2a an arrangement of for instance three parallel connection positions 6 is shown schematically in a part of the protective suit. Each individual connection position has the form of a long narrow strip. A section BB according to FIG. 2b shows that the lateral separation between the strip shaped connection positions 6 is shortened, as soon as the gas in the hollow spaces 5 between the layers 3, 4 flows in and is put under pressure.

If now a formation comprising layers 3, 4—the lining 1 and the oversuit 2 are omitted for clarity—is laid about a body part, for instance a thigh, then there results as is schematically shown in FIG. 2c:

The outer layer 4 is tensioned to a tension σ, the inner layer lies, essentially tension free, against the body surface; in the inside of the hollow space 5 the pressure p applies. This builds up the tension σ, which is transmitted via the connection positions 6, so that a particular pressure p corresponds to a particular tension.

If now two—shown in section—hollow spaces 5 are arranged such that a separation zone 7 lies between them, which does not include a hollow space 5, then the tension σ is transmitted essentially without loss from hollow space 5 to hollow space 5. The decrease of tension which normally follows with an angle of contact α;

$$\sigma(\alpha) = \sigma_0 \cdot e^{-\alpha \cdot f_H}$$

where

σ₀=initial tension $f_H$=coefficient of static friction applies only for rigid enclosed bodies. Human body tissue is however largely compliant and deformable.

The separation zone 7 can comprise the layers 3, 4 lying on top of each other, or rather a flexible but nevertheless low stretch textile material, for instance the layer 3 or the layer 4 only, or another suitable textile material. The connection points 6 are immediately adjacent to the hollow spaces. They can, as shown in FIG. 1, 2, connect the layers 3, 4, or additionally ensure the connection to the textile material, from which the separation zone 7 is produced.

Figure 4:
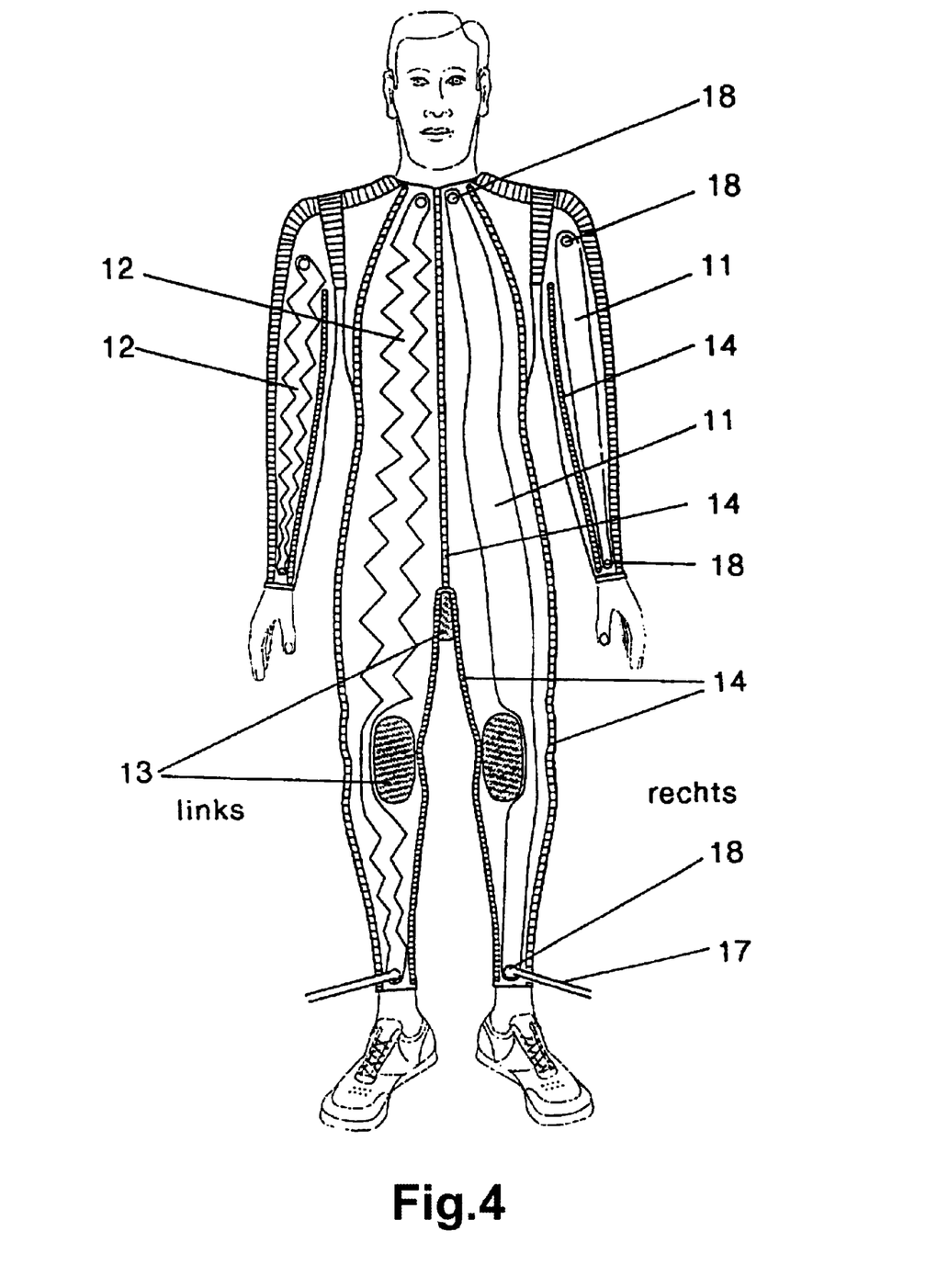

FIG. 4 shows a first example of construction of the protective suit according to the invention, in two modifications. The two modifications relate to the production of the left and the right sides of the protective suit.

In the first modification on the right a first band 11 is shown, which extends here from the neck down to the ankle. In a similar version this first band 11 is also present on the sleeve, from the shoulder to the wrist. The bands 11 can be made continuous—as drawn—or interrupted once or more times. Similarly several bands 11—continuous or interrupted—can be applied alongside each other. The contraction of these bands, which are produced as hollow spaces 5, takes place exclusively at right angles to the body axis.

The modification on the left in FIG. 4 has zig-zag shaped bands 12, analog to the arrangement on the right. The contraction of the band shaped hollow spaces 5 here occurs both at right angles to, an along, the body axis.

Instead of the zig-zag pattern, the bands 12 can also be formed with rounded corners in a wave shape, as also every transition shape between zig-zag (left) and stretched (right) is included in the concept of the invention. In the knee region the suit is for instance provided with elastic inserts 13, and also in the genital region.

Several zip fasteners 14 are provided to close the suit. They open both the sleeves and also the whole suit from the neck section to the ankles. In FIG. 4 all the zip fasteners 14 are shown as continuous. It is however within the concept of the invention to produce the zip fasteners 14 in two parts—or even in several parts along the length.

It is also possible, in conjunction with the vertical division of the bands 11, 12 and the zip fasteners 14, to make the whole suit in two parts, as jacket and trousers.

Advantageously valves 18 are positioned at the lower and/or upper ends of the bands 11, 12, which can be joined to hoses 17. Their function and task is discussed below in the description of FIG. 7. The width and the arrangement of bands 11, 12 is more clearly explained under FIG. 5, 6.

Figures 5, 7:
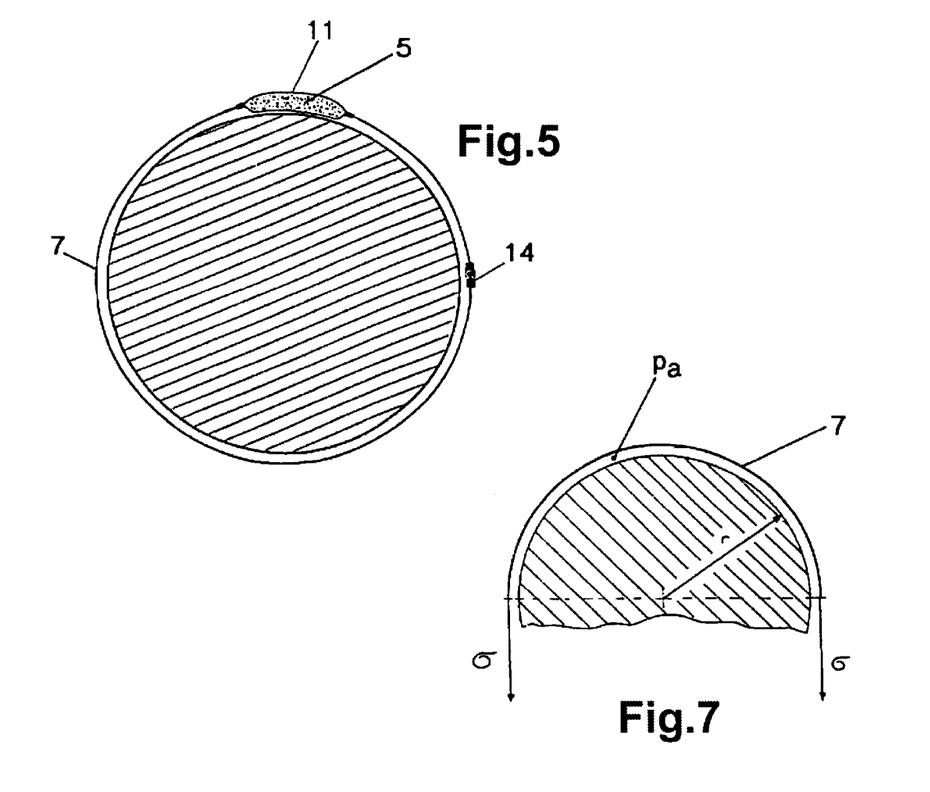

FIG. 5 shows a schematic section of the suit for instance through the thigh. As an example without any limiting characteristic the suit has a band 11 along the thigh, which here appears in section as a hollow space 5.

The separation zone 7 abuts both sides of the band 11, 12, which is shown here, for greater clarity, not lying on the body. The suit is closed with the schematically illustrated zip fastener 14.

If now the hollow space 5 is supplied with compressed gas, it inflates, shortens itself thereby and exerts a tensile force σ (N/m) on the textile material forming the separation zone 7. This again generates a pressure on the body part shown.

Figure 6A:
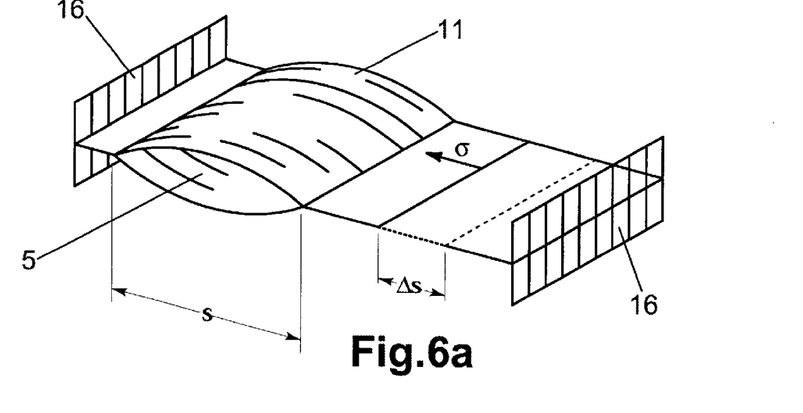
Figure 6B:
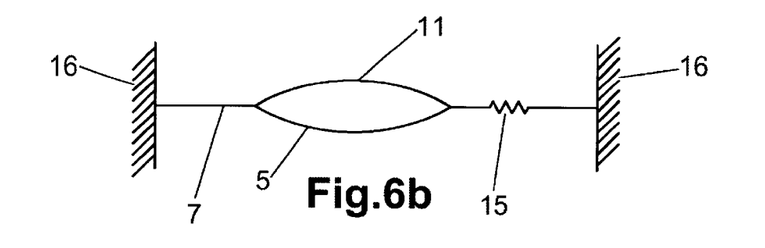

FIG. 6 is a heavily schematised representation of the separation zone 7, the hollow space 5, the shortening Δs which arises due to the inflation of the hollow space 5 and the resultant tensile force σ.

FIGS. 6a, b serve to explain the connection of the named values with the original width so of the hollow space 5 and the pressure applying in the hollow space 5. FIG. 6a is a perspective view, FIG. 6b a schematic section. For this explanation, the suit is open and stretched between two fixed reference walls 16.

FIG. 6a shows the displacement Δs, FIG. 6b an elasticity 15 schematically. This comprises the—predominantly elastic—flexibilities of the textile materials, the zip fastener 14 and the body weave.

For a tensile force σ in the arrangement according to FIGS. 6a, b, the equation:

$$\sigma = p_L \cdot s_0 \cdot fct\left(\frac{\Delta s}{s_0}\right), \text{ applies} \qquad \text{(Equ'n 1.)}$$

The tensile force is thus proportional to the filling pressure $p_L$ in the hollow spaces 5 and proportional to the width $s_0$ of the non deformed hollow space 5 of the band 11, 12. The function $$fct\left(\frac{\Delta s}{s_0}\right)$$

of the ratio $$\left(\frac{\Delta s}{s_0}\right)$$

of the shortening of the original width is highly non-linear. The ratio lies $$0 < \frac{\Delta s}{s_0} < 1 - \frac{2}{\pi} \quad \text{(equ'n. 2)}$$

where $$\frac{\Delta s}{s_0} = 0$$

applies for the completely flat inflated hollow space $$\frac{\Delta s}{s_0} = 1 - \frac{2}{\pi} = 0.363$$

applies for the cylindrical inflated hollow space.

If with the presence of one band 11, 12 with a certain pressure p a preselected shortening Δs occurs, then the width of this band can immediately be calculated from the simple geometry according to FIG. 6b. If however the shortening is to be increased without increasing the tensile force σ at the same pressure, then two or more bands 11, 12 are chosen.

The connection between the tensile force σ and the applied pressure $p_a$ can be taken from FIG. 7. The textile material designated separation zone 7 is shown, which encloses a cylindrically represented body part with the tensile force σ. Only half of this body part is shown. If one takes— perpendicular to the plane of the drawing—a length L of this body part, then one obtains $$p_a \cdot 2r \cdot L = 2\sigma \cdot L \quad \text{(equ'n. 3)}$$

or $$p_a = \frac{\sigma}{r} \quad \text{(equ'n. 4)}$$

From equ'n. 4 it is seen that for the same tensile force the applied pressure is inversely proportional to the radius (or diameter) of the body part under consideration; this is under the indicated assumption that the width $s_0$ of the band 11 or 12 is the same overall.

Assuming an equal overall air pressure it is possible, taking account of the body radii and using modification of the width $s_0$ and the number of bands 11, 12 to generate such a modification of applied pressures $p_a$, that the condition $$p_a = p_i$$

i.e. the applied pressure should correspond to the fluid pressure of the body, can practically be fulfilled, under the precondition that the filling pressure $p_L$ of the hollow spaces 5 and the bands 11, 12 shows a proportional dependency on the z-acceleration to the fluid pressure within the body.

If one takes the statements of equation 1, equation 4 and equation 5 together, it follows from them that the compensation of the inner pressure $p_i$ is fulfilled by the air pressure $p_L$ applying in the hollow spaces 5, in so far as $$p_i = \frac{p_L \cdot s_0}{r} \cdot fct\left(\frac{\Delta s}{s_0}\right), \quad \text{(equ'n. 6)}$$

Figure 10:
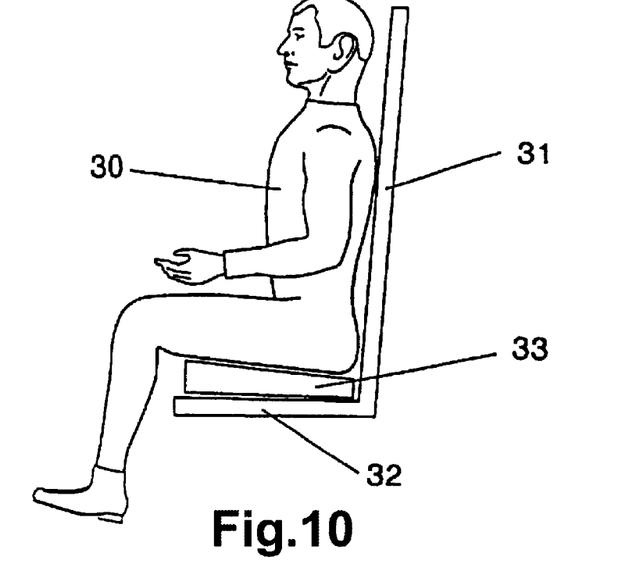
Figure 11:
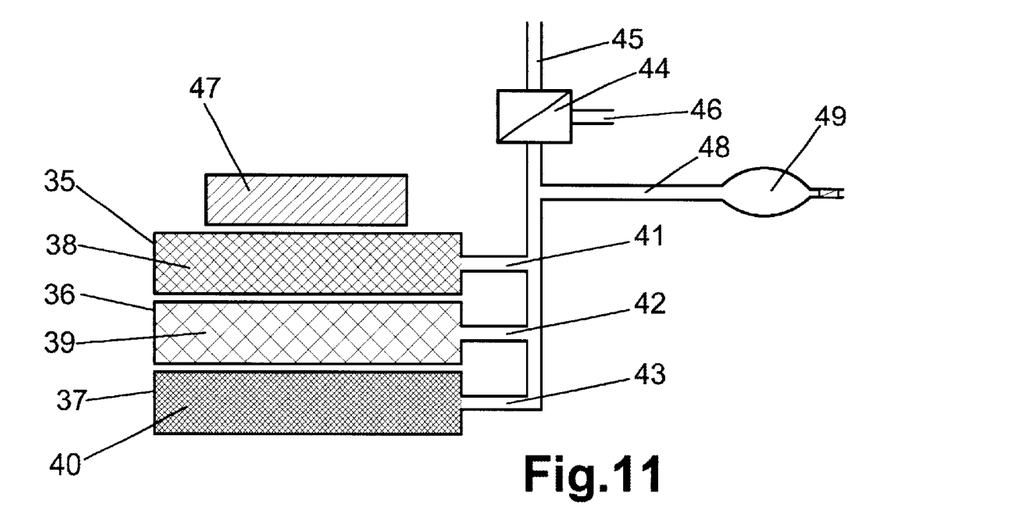

Where
$p_i$=local, acceleration-dependent inner pressure
$p_L$=gas pressure in the hollow spaces 5
$s_0$=local width of the bands 11, 12
r=local radius of the body part In addition to this there are on the one hand known aircraft side regulators, on the other side an inventive solution is proposed here, which is more clearly described using FIGS. 10, 11.

As already mentioned, the bands 11, 12 and the whole suit can both be made in two or more parts. The individual vertical divisions of the bands 11, 12 can here, on the one hand, stand at the same pressure or be subjected to different pressures. As a third possibility within the inventive concept a solution is proposed whereby the increase of pressure—with the onset of positive Z-accelerations—can be built up in stages over time. For instance the bands 11, 12 can be so subdivided that the feet, the lower leg, the thigh, the stomach region, the upper body and the arms could each form their own pressure region. In this way the increase of pressure from below to above can be built up. Solutions for this are for instance external, that is aircraft side controls for the individual pressures, further the gas effecting the build up of pressure can be taken to the lowest point of the suit under consideration and the other pressure regions supplied from below via overflow valves. It is equally within the concept of the invention to supply the individual regions centrally and for instance to supply the individual regions via overflow valves of different throughputs. Both the pressure distribution and their build up over time are on the one hand also dependent on the intended flight manoeuvres. A description of them here is outside the concept of the invention; essential to the invention is the making available of suitable devices for this.

In order to realise these examples of construction, the individual hollow spaces 5 arranged in the bands 11, 12 are either joined together by the tubes 17 with valves 18 (see FIG. 4) or with a pressure supply unit.

If the suit is made in two parts as a jacket and trousers, then the two parts are to be provided with velcro fasteners so that they cannot be displaced with respect to each other. This is simple to effect according to the invention, since the tensile forces σ in the suit almost without exception arise, and should arise as circumferential tensions around the individual body parts.

Figure 8:
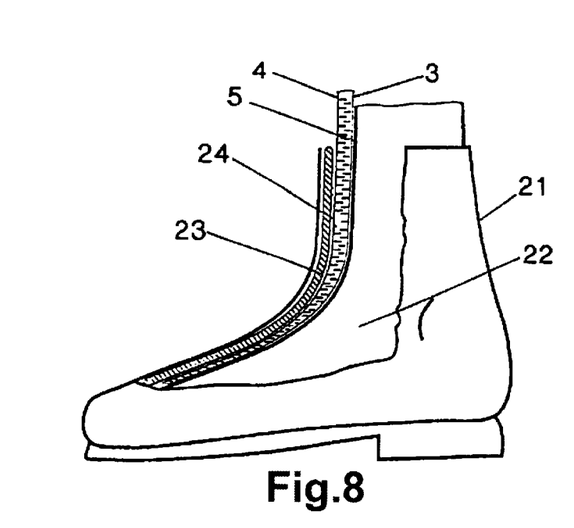

FIG. 8 shows a first example of construction of a flying boot 21 in side view, partly cut away. Between the foot of the wearer—given the reference number 22 and a normal tongue 23 fastened to the boot 21, a double walled second tongue 24 is inserted, again comprising the layers 3, 4, which has a hollow space 5. The second tongue 24 can be formed as an extension of the leg part of the suit; it can however also be provided that the tongue 24 is connected to the suit or to a central compressed air supply by means of a hose connection.

Figure 9:
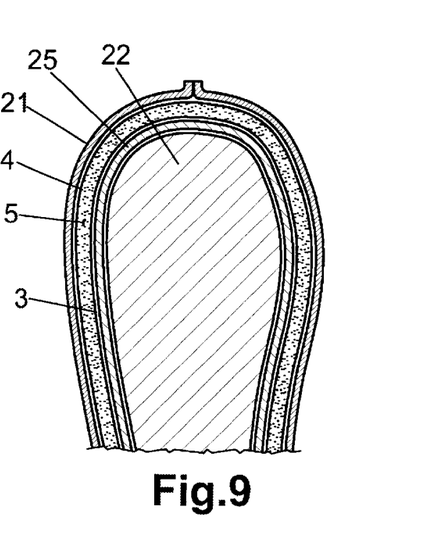

In the second example of construction of the flying boot 21 according to FIG. 9, where a schematic horizontal section of it is shown, essential parts of the foot 22—or also the whole foot 22—are enclosed by a hollow space 5 formed by the layers 3, 4. In FIG. 9 a horizontal section of this is also shown.

A flying boot 21, for instance of leather, includes—like an inner shoe—the hollow space 5 formed from layers 3, 4, which can be filled with a gas and put under pressure. On the inside, against the foot 22 the flying boot is lined with a further envelope 25, for instance of thin leather or textile material.

FIGS. 10, 11 are the representations of a compressed gas supply according to the invention. They show a pilot 30 from the side, sitting on a pilot's seat 31 with sitting surface 32. In this sitting surface 32 a cushion 33 is for instance integrated, which is shown in FIG. 11 in detail. The cushion 33 comprises in the representation of FIG. 11, in the sense of an example, three essentially independent layers 35, 36, 37, each of which is enclosed in an airtight manner in a low-stretch textile material. Internally the layers 35, 36, 37 each include an open pored plastics foam material 38, 39, 40. These are advantageously of different hardness, such that the hardness increases from the uppermost layer 35 to the lowest layer 37.

The hardness of the plastics foam material 38 of the uppermost layer 35 is selected such that it bears a pilot, without nominally being deformed. Each airtight enclosed layer has a connection 41, 42, 43 leading to the outside for instance in the form of a tube in each case. The three connections 41 to 43 open into a ventilation valve 44, whose method of operation is further described below. It has an outlet 45 and a flooding inlet 46. A connection 48 is provided, communicating with the layers 35 to 37, at whose end a manual or electrically operated hand pump 49 is shown. Using this hand pump 49 the system, comprising the suit and the three layers 35, 36, 37, can be inflated to a required starting pressure. Instead of the hand pump 49 an adjustable valve can also be used, which is connected to the on-board compressed gas source. Obviously under starting pressure is to be understood the pressure difference between the inside of the air carrying parts (cushion 33, hollow spaces 5, tubes 8) on the one hand, and the pressure in the cabin of the aircraft on the other. With a thereafter lowering pressure in the cabin of the aircraft, the pressure in the quoted air carrying parts increases automatically.

The flooding outlet 46 can be integrated both into the hand pump 49, and also into the adjustable valve taking its place.

The outlet 45 is for instance connected to the lowest valve 18 of the suit.

If now the pilot 30—or in the case of a multi-seat aircraft another member of the flight crew—sits on the cushion 33, then the plastics foam materials 38 to 40 are as stated adjusted such that they are essentially not compressed. Within the layers 35 to 37 the same pressure applies as in the hollow spaces 5. The cushion 33 and the suit are pumped up by the hand pump 49 until all the stretchings of the suit are at least compensated. In addition an overpressure can be built up, which causes an applied pressure in the suit, which corresponds somewhat to the acceleration of 1 G.

If the pilot 30, who in FIG. 11 is only entered as a mass 47, experiences an additional acceleration, then the plastics foam material 38 in the uppermost layer 35 is pressed in and the air escaping from this layer 35 builds an additional pressure in the hollow spaces 5, which increases the tension σ in the textile separation zones 7 of the protective suit.

If the force produced by the pilot 30—or by the mass 47—exceeds a mass, at which the layer 35 is completely pressed together, the plastics foam material 39 in the layer 36 begins to be compressed. A similar process occurs with the still harder plastics foam material 40 in the layer 37.

Following the release of the G loading the plastics foam materials 38 to 40 take up air again and assume their original shape, and the pre-tensioning pressure in the hollow spaces 5 returns to the original value.

Before the pilot 30 climbs out, the flooding inlet 46 is opened and the inside of the layers 35 to 37, and therewith also the plastics foam materials 38 to 40, are in equilibrium with the outside world.

What has been described here for three layers 35 to 37, can also be set out for smaller and thereby thicker graduations also using two layers 35, 36 or without gradation also with a single layer 35. Thus at least one layer 35 of the cushion 33 is in accordance with the invention.

Alternatively to FIG. 11, the cushion 33 can also be spatially divided: the layer 35 can be integrated into the protective suit—inside or outside—the layer 36 can be clipped onto the outside of the suit, the third layer 37—insofar as it is present—can be a component of the seating surface 93. The connections 41 to 43 are then preferably made as plug-in fast connectors, similarly the connection of the outlet 45 with the valves 18 to the hollow spaces 5.

Figure 12:
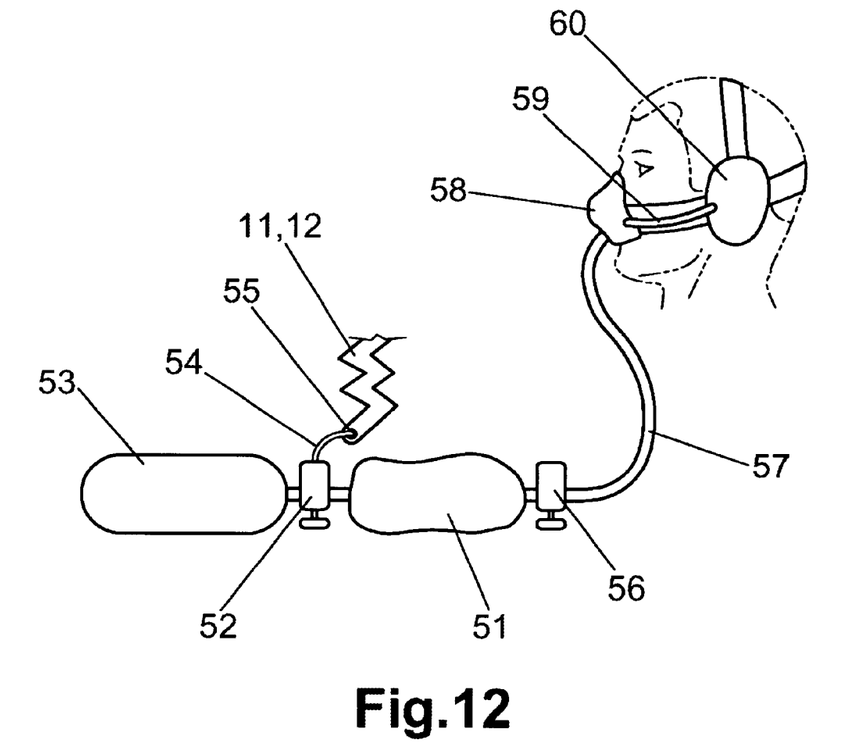

In order to set an increased breathing pressure against the applied pressure in the thorax region, pressure breathing is provided for higher G exposures. A bladder 51 also made of a textile reinforced plastics material is worn under the suit in the stomach region, where it is secured against movement. It forms—as shown in FIG. 12—the average pressure reservoir of a lung automat, similar to that also known from sport diving. The bladder is fed via a pressure activated regulating valve 52 from the on-board high pressure reservoir 53 for breathing air, here shown schematically as a pressure bottle. The regulating valve 52 reduces the pressure of the breathing gas from the high pressure reservoir 53 to a pressure, which lies a little above the lung pressure. It is controlled via a pressure line 54, which communicates with one of the bands 11, 12. The pressure line 54 opens in the abdominal region at a transfer point 55 into one of the bands 11, 12 and accepts the air pressure applying at the transfer point 55 as control value. This controls a pressure reducing valve (not shown) and feeds the pressure line 54 with the now reduced pressure originating from the high pressure reservoir 53.

The bladder 51, worn under the protective suit, is impacted on the one hand by its tension σ and the high pressure reduced by the regulating valve 52 to the average pressure $p_m$. By the type of the apparative definition of $p^m$, this corresponds to the hydrostatic pressure in the abdominal region, so that the belly organs are not loaded and the diaphragm is freed from the force of their instantaneous weight. The exact value of $p_m$ can be set by the regulating valve 52 for the individual case.

A further regulating valve 56, likewise known from the lung automats in sport diving, is connected to the bladder 51, which responds to breathing activity. With this the breathing pressure $p_a$ lies only a little below the average pressure $p_m$. The regulating valve 56 feeds the breathing tube referenced 57 and a breathing mask 58.

On breathing in the bladder 51 partly empties by a volume, which is smaller than the volume of the breath. In order to make these volumes the same, the second regulating valve 56 can have an overflow device, which blows off a predetermined adjustable portion of the breathing air directly via the regulating valve 56 to the outside.

In the flying helmet (not shown) integrated into it or separate from it, the pilot wears a shell shaped audio headset 60, which lies closely on the head. Connecting tubes 59 lead on each side to the breathing mask 58. It can thereby be ensured that both sides of the ear drum are impacted with the same pressure—the breathing pressure. The breathing mask 58 and audio headset 60 belong in any case to the pilot's equipment; the only additions are the two connecting tubes 59.

What is claimed is:

1. A pneumatic suit for the protection of flying personnel from acceleration forces comprising:

an active part that includes double walls and is filled between the walls with a gas, which, such that, when accelerations >1 g occur in an instantaneous and local z-axis, a compensating pressure is built up corresponding to a local internal pressure $p_i$ of a wearer of the suit, the at least one portion including a low stretch textile material that includes two superimposed layers joined together at connecting positions, so that airtight hollow spaces arise between the connecting positions, wherein the hollow spaces extend in a direction of an axis of a body of the wearer over at least a part of the length of the suit as bands of local width $s_0$, the bands being joined together by separation zones comprising low stretch textile material joined to the bands at the connecting positions, wherein the bands operate in conjunction with a part of the body surrounded by the suit having a local radius r and a local internal pressure $p_i$ to compensate for a local internal pressure $p_i$ of the body part by application of a gas pressure $p_L$ in the hollow spaces by a buildup of a local tensile force s in the suit in accordance with the equation $$p_i = \frac{p_L \cdot s_0}{r} \cdot fct\left(\frac{\Delta s}{s_0}\right),$$

wherein $$\frac{\Delta s}{s_0}$$

represents a relative local shortening of the bands, the bands having valves by which they can be connected with each other and with an external pressure source;

means to change the gas pressure $p_L$ in response to the instantaneous and local z-acceleration;

means to close the suit; and means to match the suit to instantaneous bodily conditions of the wearer.

2. A suit according to claim 1, wherein the suit covers essentially the whole body of the wearer except the neck, head, hands and feet.

3. A suit according to claim 2, wherein the hollow spaces are made gas-tight by insertion of a tube.

4. A suit according to claim 3, wherein the tube comprises an elastomer.

5. A suit according to claim 2, wherein the hollow spaces are made by gas-tight manufacture of the layers and gas-tight manufacture of the connecting positions.

6. A suit according to claim 2, further comprising a lining and an oversuit, wherein the lining is worn under and the oversuit is worn over the active part of the suit.

7. A suit according to claim 1, wherein the hollow spaces are made gas-tight by insertion of a tube.

8. A suit according to claim 7, wherein the tube comprises an elastomer.

9. A suit according to claim 1, wherein the hollow spaces are made by gas-tight manufacture of the layers and gas-tight manufacture of the connecting positions.

10. A suit according to claim 1, further comprising a lining and an oversuit, wherein the lining is worn under and the oversuit is worn over the active part of the suit.

11. A suit according to claims 1 or 2, wherein the bands are essentially bordered by connecting positions in a straight line.

12. A suit according to claims 1 or 2, wherein the bands are bordered by connecting positions formed in a wave shape.

13. A suit according to claims 1 or 2, wherein the bands are essentially bordered by zig-zag formed connecting positions.

14. A suit according to claims 1 or 2, wherein the means of closing the suit comprises zip fasteners.

15. A suit according to claims 1 or 2, wherein the means of matching the suit to the instantaneous bodily conditions of the wearer comprise hook-and-loop fasteners.

16. A suit according to claims 1 or 2, wherein the hollow spaces are made by gas-tight manufacture of the layers and gas-tight manufacture of the connecting positions, the suit further comprising for each hollow space at least one valve for inflating and deflating the hollow space.

17. A suit according to claim 16, wherein the individual hollow spaces are connected by tubes via the valves to a central pressure supply.

18. A suit according to claim 17, wherein the individual hollow spaces are connected to each other by tubes via the valves such that hollow spaces lying over each other in a z-direction are connected together in series and valves lying lowest in the z-direction are connected by tubes to a central pressure supply, and the central pressure supply exists on an aircraft side.

19. A suit according to claim 16, wherein the individual hollow spaces are connected to each other by tubes via the valves, such that hollow spaces lying over each other in the z-direction are connected together in series and the valves lying lowest in a z-direction are connected by tubes to a central pressure supply.

20. A suit according to claims 1 or 2, wherein the hollow spaces are made gas-tight by insertion of a tube, the suit further comprising for each hollow space at least one valve for inflating and deflating the hollow space.

21. A suit according to claim 20, wherein the individual hollow spaces are connected by tubes via the valves to a central pressure supply.

22. A suit according to claim 21, wherein the individual hollow spaces are connected by tubes via the valves to a central pressure supply and the central pressure supply exists on an aircraft side.

23. A suit according to claim 20, wherein the individual hollow spaces are connected to each other by tubes via the valves such that hollow spaces lying over each other in a z-direction are connected together in series and valves lying lowest in the z-direction are connected by tubes to a central pressure supply.

24. A suit according to claims 1 or 2, further comprising:
at least one valve for each hollow space for inflating and deflating the hollow space;
a central pressure supply connected by tubes via the valves each hollow space;
a cushion that can be divided into several layers, wherein each cushion layer is closed airtight and includes an open pored plastics material pad and wherein the cushion layers are filled with air, whereby an additional pressure can be exerted on the hollow spaces of the suit in the presence of accelerations >1 g; and
a connection to each cushion layer that can be connected to the hollow spaces, wherein the cushion is inserted between a body of the wearer and a seating surface of a pilot's seat and can optionally be fastened to the suit or to the pilot's seat.

25. A suit according to claim 24, wherein the cushion has only one layer.

26. A suit according to claim 24, wherein the cushion has two layers comprising plastics material foam, each cushion layer including a connection to the suit, wherein a lower plastics material foam is harder than an upper plastics material foam.

27. A suit according to claim 24, wherein the cushion has three layers comprising plastics material foam, each cushion layer including a connection to the suit, wherein a lowest plastics material foam is harder than a middle plastics material foam and the middle plastics material foam is harder than an uppermost plastics material foam.

28. A suit according to claim 24, further comprising a hand pump connected to the cushion with which the cushion and the hollow spaces can be pumped up to a pre-selected starting pressure.

29. A suit according to claim 28, wherein the hand pump is adapted for manual operation.

30. A suit according to claim 28, wherein the hand pump is adapted for electrical operation.

31. A suit according to claims 1 or 2, further comprising:
   an anatomically-formed bladder comprising an elastomer, the bladder being arranged inside the suit in a stomach/abdominal region of the wearer adapted to be joined externally to the suit;
   a bladder inlet and outlet of the bladder, each of which opens outside the suit and is closed by regulating valves, wherein a first regulating valve reduces a pressure of breathing gas from a high pressure supply to an average pressure, wherein a predetermined position control value in the suit can be transmitted to the first regulating valve via a pressure line;
   a breathing mask adapted to be worn by the wearer; and
   a second regulating valve that can reduce the average pressure to a breathing pressure and includes an outlet that opens into a breathing tube.

32. A suit according to claim 31, further comprising an overflow device at a suitable position between and connected to both the second regulating valve and the breathing mask.

33. A suit according to claim 32, further comprising an audio headset adapted to be worn by the wearer and connected by connecting tubes to a position carrying the breathing pressure, so that a same pressure is applied to an outside as to an inside of an ear drum of the wearer.

34. A suit according to claim 1, wherein the connecting positions are created by gluing.

35. A suit according to claim 1, wherein the connecting positions are created by welding.

36. A suit according to claim 2, further comprising an at least in part double-walled flying boot comprising hollow spaces that are connected with the hollow spaces of the suit.

37. A suit according to claim 36, wherein the whole flying boot is essentially made double walled.

\* \* \* \* \*

UNITED STATES PATENT AND TRADEMARK OFFICE
CERTIFICATE OF CORRECTION

PATENT NO. : 6,325,754 B1
DATED : December 4, 2001
INVENTOR(S) : Andreas Reinhard et al.

It is certified that error appears in the above-identified patent and that said Letters Patent is hereby corrected as shown below:

<u>Column 3,</u>
Lines 8-18, replace "FIGS. 2a,b,c, show in detailed views the application of connection positions 6 to the layers 3, 4. As already explained, these connection positions can be produced by welding, gluing or sewing. In FIG. 2a an arrangement of for instance three parallel connection positions 6 is shown schematically in a part of the protective suit. Each individual connection position has the form of a long narrow strip. A section BB according to FIG. 2b shows that the lateral separation between the strip shaped connection positions 6 is shortened, as soon as the gas in the hollow spaces 5 between the layers 3,4 flows in and is put under pressure." with
-- FIGS. 2a,b,c, show in detailed views the application of connection positions 6 to the layers 3, 4. As already explained, these connection positions can be produced by welding, gluing or sewing. In FIG. 2a an arrangement of for instance three parallel connection positions 6 is shown schematically in a part of the protective suit. Each individual connection position has the form of a long narrow strip. A section 2b-2b according to FIG. 2b shows that the lateral separation between the strip shaped connection positions 6 is shortened, as soon as the gas in the hollow spaces 5 between the layers 3, 4 flows in and is put under pressure. --

Signed and Sealed this

Fourth Day of November, 2003

JAMES E. ROGAN
*Director of the United States Patent and Trademark Office*